May 13, 1941.  J. R. McCORDIC  2,242,038
GEARSHIFT CONTROL MECHANISM
Filed March 1, 1939  5 Sheets-Sheet 1
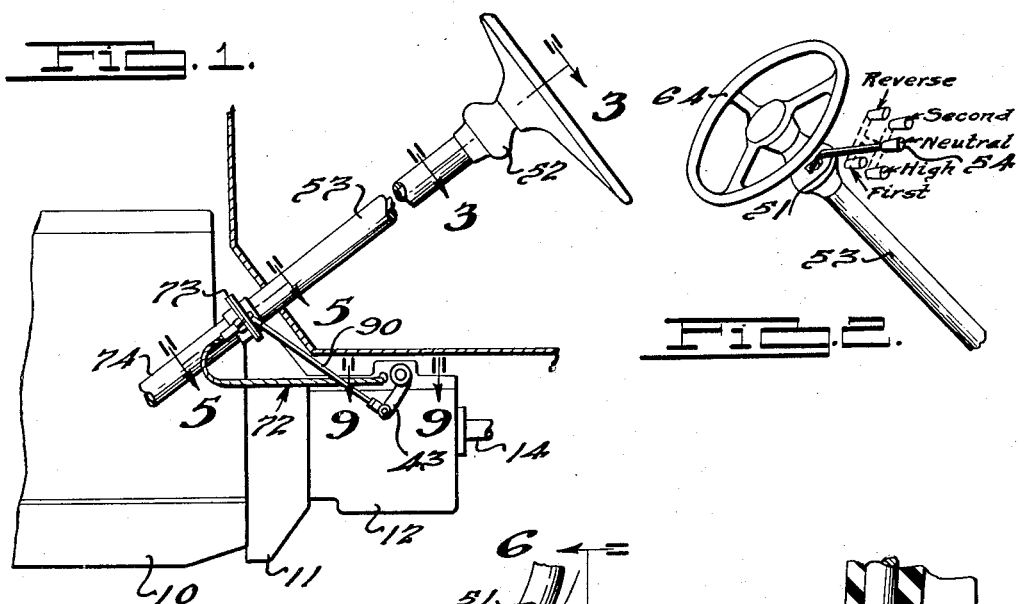
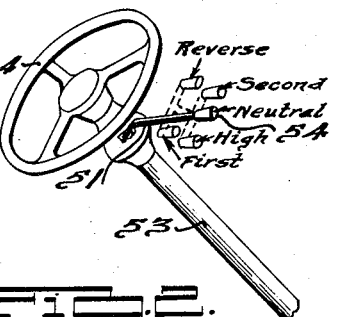
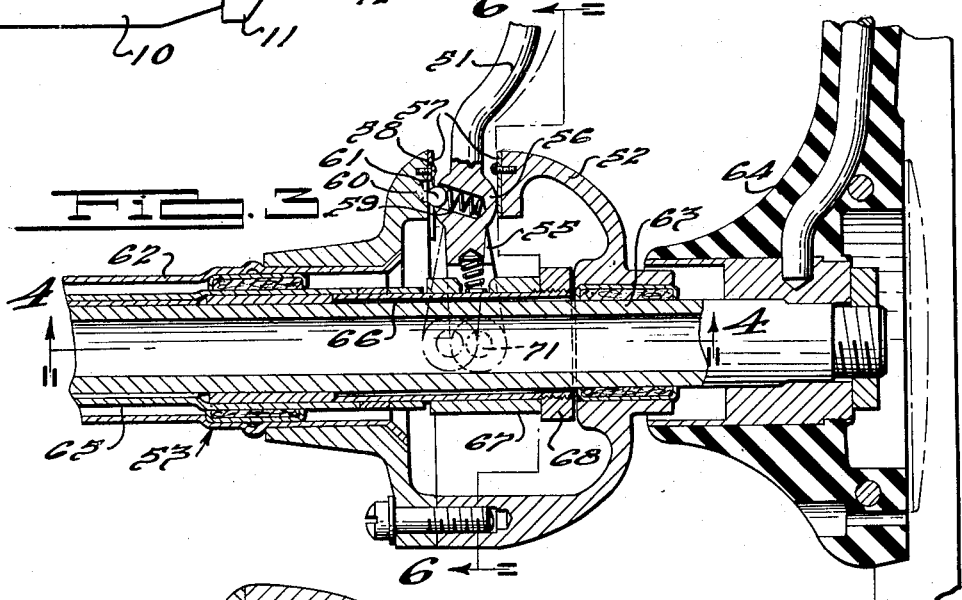
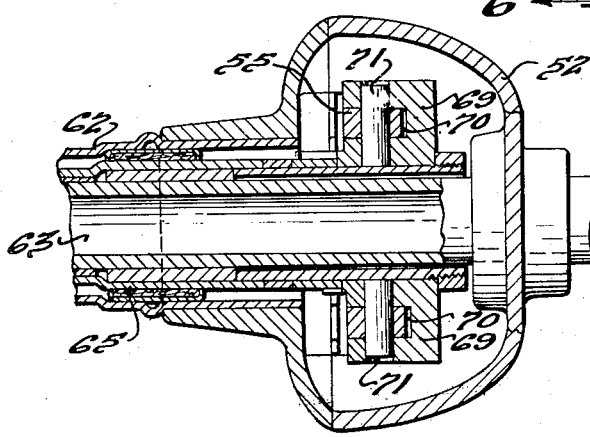
INVENTOR
James R. McCordic.
BY Harness, Lind, Patee & Harris
ATTORNEYS.

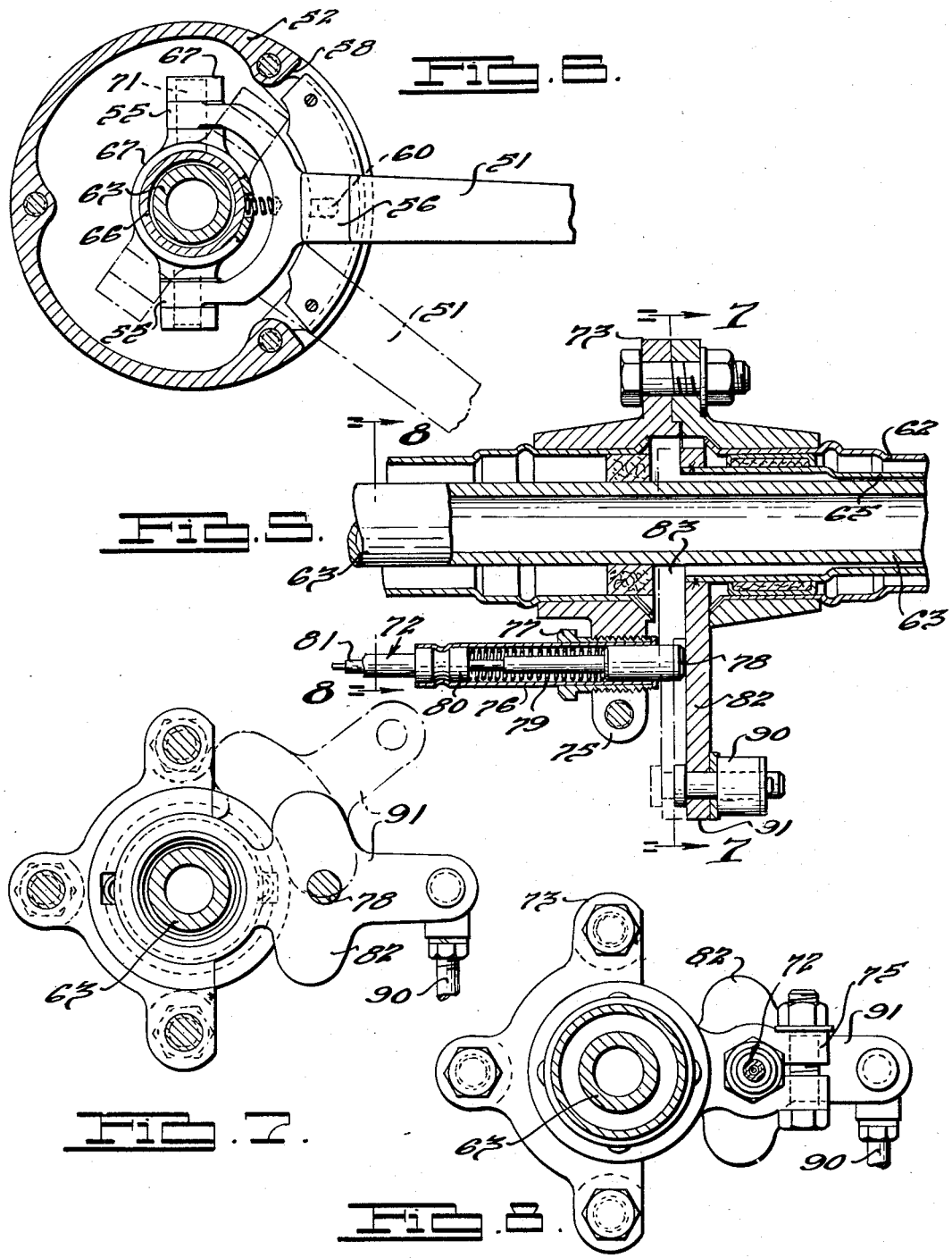

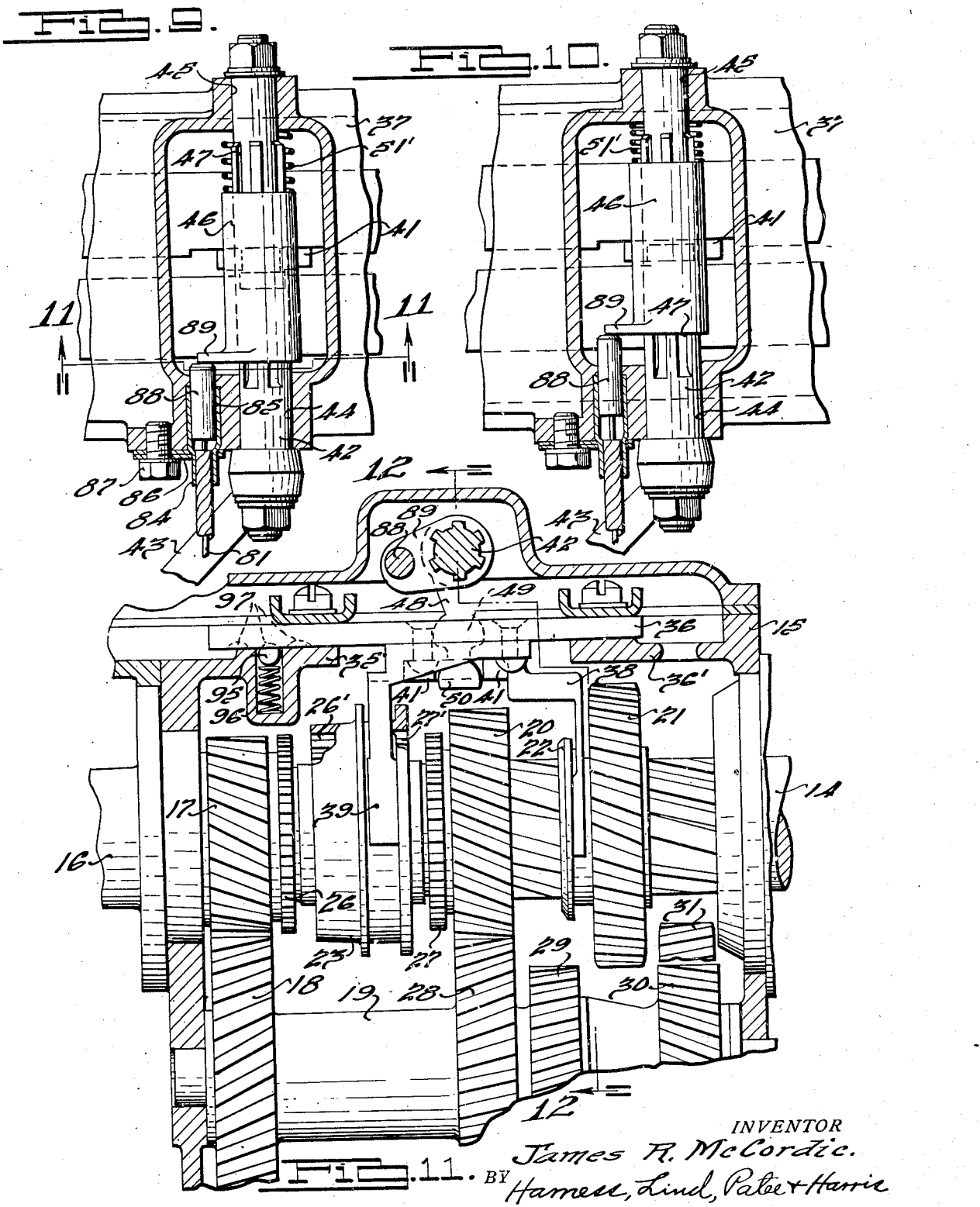

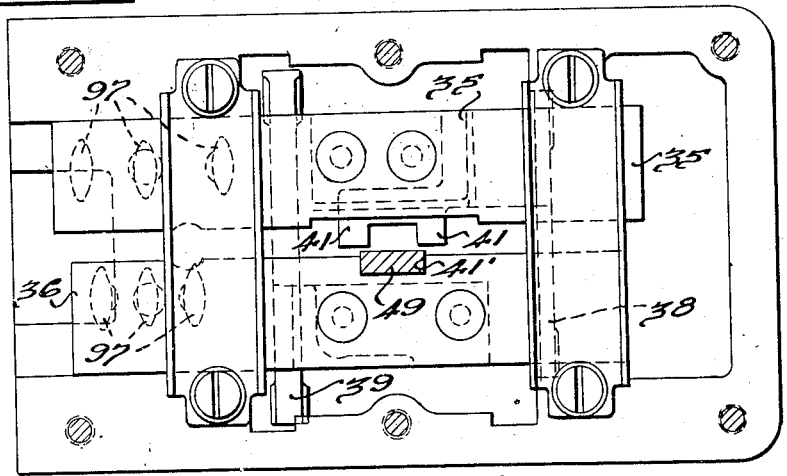
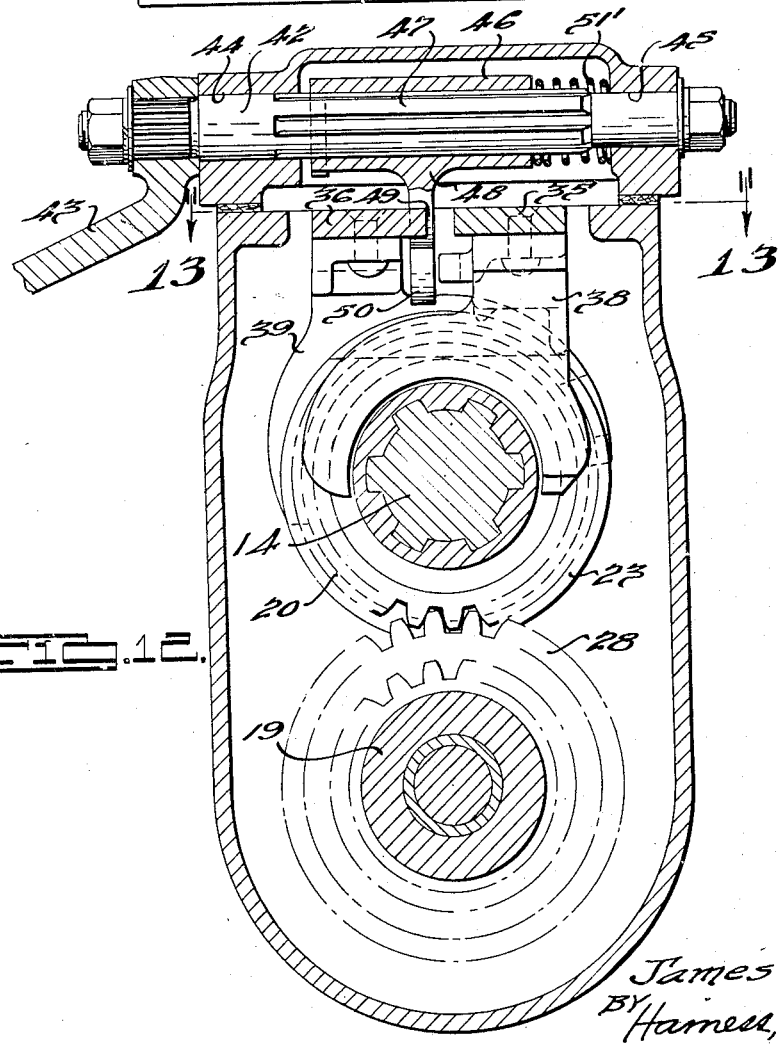

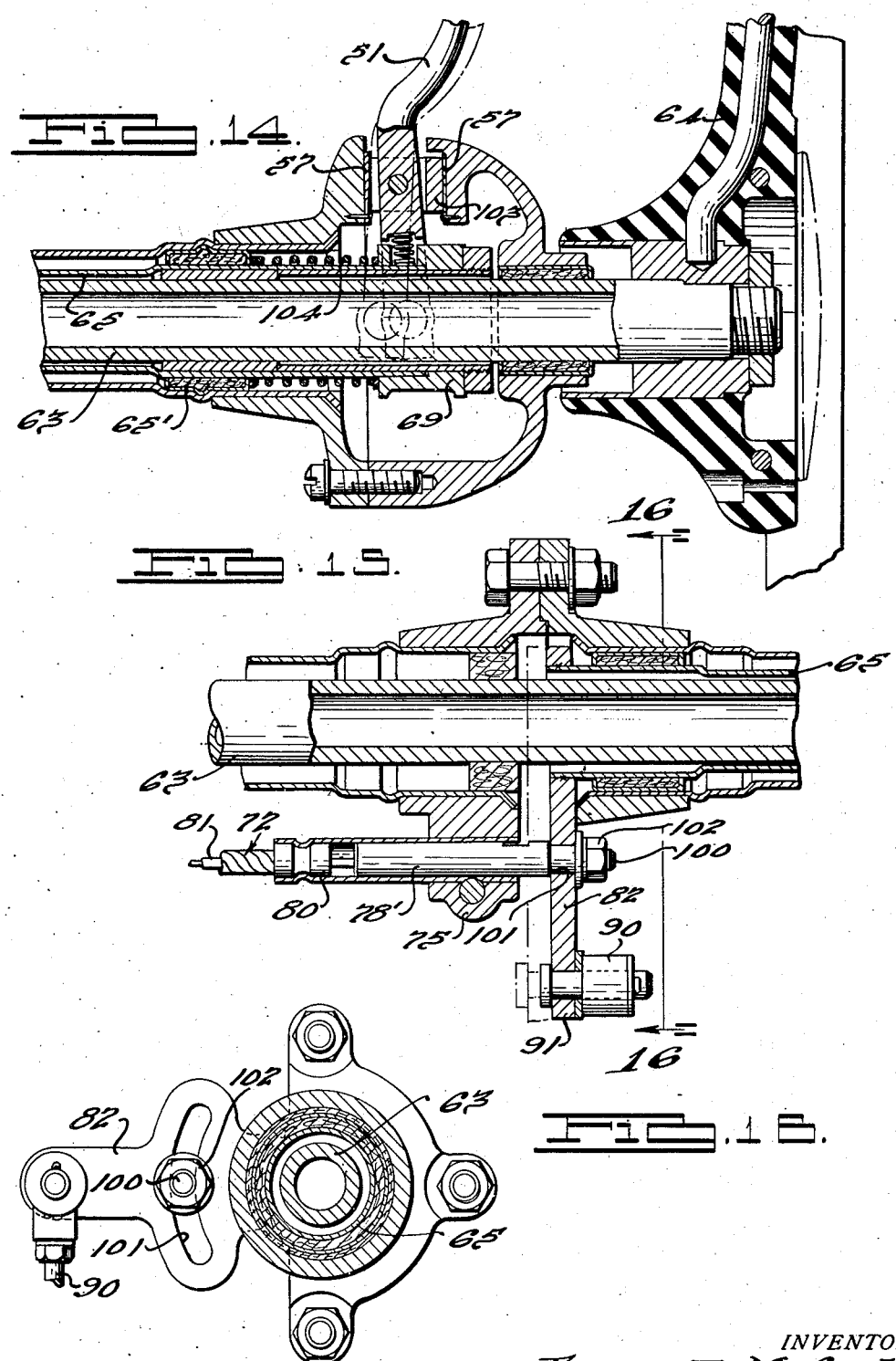

Patented May 13, 1941

2,242,038

UNITED STATES PATENT OFFICE 2,242,038

GEARSHIFT CONTROL MECHANISM

James R. McCordic, Royal Oak, Mich., assignor to Chrysler Corporation, Highland Park, Mich., a corporation of Delaware Application March 1, 1939, Serial No. 259,219

11 Claims. (Cl. 74—484)

This invention relates to improvements in control mechanism for variable speed transmission mechanism.

More particularly, the invention pertains to improved gear shifting control apparatus for motor vehicle transmissions which is adapted to be mounted on the steering column structure of the vehicle.

The principal object of the invention is to provide, in a steering column mounted gear shift control mechanism having a manually actuated shift lever movable in two transversely connected paths about the longitudinal axis of the column, means for normally maintaining the manually actuated shift lever in one of said paths.

An additional object is to provide means associated with the transmission rail shifting member for constantly urging said member into engagement with one of the rails whereby said member is always engaged with said one rail when the control lever is in the neutral position.

A further object is to provide a transmission control mechanism of this type in which the shift from low speed to second speed may be accomplished by a forward motion of the shift lever about the longitudinal axis of the steering column, and the shift from second speed to high speed may be accomplished by a backward motion of said lever about said axis, both of said transmission speed changes being accomplished without any movement of said lever about an axis transversely disposed with respect to said column.

Reference is made to the accompanying drawings which show two of the many possible embodiments of the invention and in which:

Fig. 1 is a diagrammatic fragmentary, vertical sectional view of a vehicle showing a transmission control mechanism embodying the invention.

Fig. 2 is a view of the steering column and gear shift lever illustrating the paths of movement of said lever in shifting the transmission gears.

Fig. 3 is a fragmentary, sectional view taken on the line 3—3 of Fig. 1.

Fig. 4 is a fragmentary, longitudinal, sectional view taken on the line 4—4 of Fig. 3.

Fig. 5 is a fragmentary, longitudinal sectional view taken on the line 5—5 of Fig. 1.

Fig. 6 is a transverse, sectional view taken on the line 6—6 of Fig. 3.

Fig. 7 is a transverse sectional view taken on the line 7—7 of Fig. 5.

Fig. 8 is a transverse sectional view taken on the line 8—8 of Fig. 5.

Fig. 9 is a horizontal sectional view taken on the line 9—9 of Fig. 1.

Fig. 10 is a horizontal sectional view similar to Fig. 9 but showing certain parts of the structure disclosed therein in a changed position.

Fig. 11 is a fragmentary longitudinal sectional view taken on the line 11—11 of Fig. 9.

Fig. 12 is a transverse vertical sectional view taken on the line 12—12 of Fig. 11.

Fig. 13 is a horizontal sectional view taken on the line 13—13 of Fig. 12.

Fig. 14 is a fragmentary sectional view of the top of the steering column showing a modified form of my invention.

Fig. 15 is a fragmentary longitudinal sectional view showing the control mechanism at the bottom of the steering column in the modified form.

Fig. 16 is a sectional view taken approximately on the line 16—16 of Fig. 15.

In the drawings is illustrated an embodiment of the invention in a motor vehicle drive including a unitary power plant having an engine 10, clutch 11 and transmission mechanism, generally designated by the numeral 12, a drive shaft 14 extends rearwardly from the transmission to the rear wheels (not shown) of the vehicle.

The transmission 12 includes a housing 15 into which extends a driving shaft 16, having a gear 17 meshed with a gear 18 fixed on a countershaft 19 which is journaled at its opposite ends in apertures in the end walls of the housing 15. The driven shaft 14 extends into the housing 15 and has a gear 20 journaled on its internal end portion. A slidable gear 21, disposed on the right side of the gear 20 and splined on the shaft 14, is provided with a shifter fork receiving collar 22. Formed on the adjacent sides of the gears 17 and 20 are hub portions which are provided with external clutch teeth 26 and 27 respectively. A shiftable clutch member 23 is splined on the shaft 14 at a location between the hub portion of the gears 17 and 20 and provided with internal clutch teeth 26' and 27' with which the clutch teeth 26 and 27 respectively are adapted to be selectively meshed. A direct drive setting of the gears may be produced by shifting the clutch member 23 to the left, as viewed in Fig. 11, to bring the clutch teeth 26 and 26' into mesh. When the clutch member 23 is shifted to the right, the teeth 27 and 27' are meshed, thereby holding the gear 20 against rotation relative to the shaft 14. The gear 20 is permanently meshed with a gear 28 on the countershaft 19 by which the gear 20 and shaft 14 are driven to establish a second speed drive. Low speed and reverse settings of the transmission may be established by shifting the gear 21 into mesh with a gear 29 on the countershaft 19 and with a reverse gear 31 driven by a pinion 30 on the countershaft respectively.

A pair of shifter rails 35 and 36 extending longitudinally of the transmission are shiftably mounted on flanges 35' and 36' of the housing 15 which are located at the upper open extremity of the latter. The rail 35 is provided with a downwardly extending fork 38 which engages the collar 22 of the gear 21 and the rail 36 is provided with a downwardly extending fork 39 which is engaged in a groove of the clutch member 23. The fork 38 is provided with a pair of spaced lugs 41 between which is receivable a fork and rail shifting finger, hereinafter described, having a part which is receivable in a notch 41' in the rail 36.

That portion of the control apparatus which is directly connected with the transmission mechanism housing is mounted on a cover 37 which is provided for closing the upper open end of the transmission housing. The cover 37 includes a crowned central portion having opposite side wall portions extending longitudinally of the transmission in which are formed registering openings 44 and 45.

A shaft 42 extending transversely of the cover 37 is journaled at its ends in the openings 44 and 45. The shaft 42 has an external end portion protruding from the cover member 37 on which a lever 43 is non-rotatably fixed. A collar 46 is disposed within the cover and axially slidably mounted on the intermediate portion of the shaft 42 which is provided with splines 47 for holding the collar and shaft against relative rotation. The collar 46 carries the rail shifting finger 48, heretofore referred to, which is provided with an intermediate lobe portion 49 that registers with and is adapted to be received by the notch 41' of the rail 36, and a lobe portion 50 that registers with and is receivable between the lugs 41 of the shifter fork 38. A coil spring 51 bears between the right wall of the cover 37 and the right extremity of the collar 46, as viewed in Fig. 12, for normally yieldably urging the collar 46 to the left so as to retain the rail shifting finger 48 in operative engagement with the rail 36 and its shifter fork 39. The collar 46 may be moved rightwardly, as viewed in Fig. 12, to bring the end lobe 50 between the lugs 41 carried by the rail 35 and shifter fork 38.

Apparatus for manually controlling the collar 46 may be mounted at any location in the driver's compartment of the vehicle within convenient reach of the driver. In the form of the invention illustrated, the manual control apparatus comprises a gear shift lever 51 which is carried by a casing 52 having separable sections mounted on the steering column, generally designated by the numeral 53. The manual control lever 51 has a knob 54 on its outer end and it has a forked inner extremity 55 disposed within the casing 52. Provided on the lever 51 adjacent its forked end is a ball-shaped enlargement 56 which is disposed between wear plates 57 mounted on the opposite side walls of an arcuate slot 58 formed in the casing 52 through which the lever extends. The enlarged portion 56 of the control lever has a bore 59 in which a spring-pressed detent 60 is disposed. The detent 60 is adapted to engage in an aperture 61 formed in the wall of the slot 58 when the lever 51 is centrally located with respect to the opposite ends of this slot.

The steering column, generally designated by the numeral 53, includes an outer tube 62 on which the casing 52 is mounted and an inner tubular steering shaft 63 which is provided with a steering wheel, generally designated by the numeral 64. The steering shaft 63 extends longitudinally of the steering column and is centrally located with the longitudinal axis thereof.

A tubular shaft 65 extends longitudinally of the steering column 53 and is axially, slidably and rotatively supported by the steering column structure. Mounted in the upper open end of the tubular shaft 65 is a sleeve 66 which is welded, or otherwise suitably secured, thereto and which extends beyond the upper extremity of this shaft. A collar 67 is concentrically mounted on the portion of the sleeve 66 which extends beyond the shaft 65 and detachably and non-rotatably held thereon by a nut 68 threaded on the right end portion of the sleeve 66 as viewed in Fig. 3. The collar 67 is provided with diametrically opposed bosses 69, shown in Fig. 4, in which are formed slots 70 for receiving the apertured end portions of the prongs of the fork 55. The fork 55 of the lever 51 is pivotally attached to the bosses 69 of this collar by pins 71 extending through registering apertures in the bosses and prongs of the fork respectively. The enlarged portion 56 of the lever 51 serves as a fulcrum about which the lever may be oscillated in a vertical plane, as viewed in Fig. 2, to shift the shaft 65 axially of the steering column in respectively opposite directions. The shaft 65 may be rotated about its axis which is coincident with the longitudinal axis of the steering column by shifting the lever 51 upwardly or downwardly from its full line position shown in Fig. 2 and during this action of the lever, the enlarged portion 56 thereof slides free on the bearing surfaces 57 with which the walls of the slot 58 in the casing 52 are lined.

Axial movement of the shaft 65 is transmitted to the collar 46 by a Bowden wire assembly generally designated by the numeral 72 in Fig. 1. One end of the Bowden wire assembly 72 is mounted on the lower element of a separable coupling 73 by which an extension 74 of the steering column housing 62 is supported. The lower element of the coupling 73 is provided with an apertured flange 75 in which a metal tube 76 is fixed by a threaded fitting 77. Slidably mounted in the tube 76 is a plunger 78 which is normally urged rightwardly, as viewed in Fig. 5, by a coil spring 79 bearing between the plunger and a plug 80 fixed in the left end of the tube 76. A flexible cable 81 extending through the plug 80 is attached to the plunger 78. The plunger 78 bears against a plate 82 which is non-rotatably fixed on the lower extremity of the shaft 65 and which extends outwardly of the coupling 73 through an opening 83 in the side thereof which is substantially twice as wide as the thickness of the plate 82 for accommodating shifting movement of the plate in unison with the axial movement of the shaft 65.

The opposite end of the Bowden wire assembly extends to the cover 37 of the transmission housing to which it is attached by a sleeve 84 disposed in an aperture 85 formed in the cover structure. The sleeve 84 has a reduced outer end portion and an adjacent shoulder which bears against a plate 86 having an aperture therein through which the reduced part of the sleeve extends. The plate 86 is firmly clamped to the transmission cover by a cup screw 87 threaded in an aperture therein.

Fixed to the end of the flexible cable 81 adjacent the transmission mechanism is a plunger 88 which is slidably mounted in the sleeve 84 and which abuts against a flange 89 formed integral with the collar 46. The spring 51' which operates upon the collar 46 normally urges the flexible cable toward the plate 82 of the shaft 65 and thereby urges the shaft upwardly so as to retain the lever 51 in the full line position shown in Fig. 3 with its driver-manipulated end in its lowermost position. When the lever is so disposed, the finger 48 of the collar 46 is engaged in the notch 41' of the shifter rail 36 and oscillatory movement of the lever 51 about the longitudinal axis of the steering column may be employed to rotate the shaft 42 and collar 46 thereon in order to bring the transmission into either a second and high speed drive setting.

Rotative movement of the shaft 65 is transmitted to the shaft 42 and collar 46 by a link 90 pivotally attached at one end to an extension 91 of the plate 82 and pivotally attached at its other end to the crank arm 43 on the shaft 42.

Referring now to Fig. 2, when the control lever 51 is in its above-described lower position, movement thereof in a counterclockwise direction about the axis of the steering column causes the shifter rail 36 to be moved toward the right as viewed in Fig. 11 to mesh clutch teeth 27' with clutch teeth 27 thereby establishing a second speed ratio setting of the transmission. Clockwise movement of lever 51 causes rail 36 to be moved toward the left as viewed in Fig. 11 to engage teeth 26' with teeth 26, thereby establishing a high speed (or direct drive) setting of the transmission.

Upward movement of the driver-operated end of the lever 51 causes the shaft 65 to be moved downwardly thereby urging the plunger 78 inwardly of its tube 76 and urging the plunger 88 of the Bowden wire assembly outwardly of its tube 84. This movement of the plunger 88 shifts the collar 46 rightwardly, as viewed in Fig. 12, to engage the lobe 50 on the lower end of the finger 78 of the collar, between the lugs 41 which are carried by the shifter rail 35 and fork 38. When the lever 51 is moved in a counterclockwise direction from its full line position shown in Fig. 2 to the dotted line position 92 while the driver-operated end of this lever is in its uppermost position, the shifter rail 35 is moved rightwardly as viewed in Fig. 11 to establish a reverse setting of the transmission mechanism. Clockwise movement of the lever 51 from its full line position shown in Fig. 2 to its dotted line position moves the shifter rail 35 leftwardly as viewed in Fig. 11 to establish a low speed ratio setting of the transmission mechanism.

The shifter rails 35 and 36 are releasably held in an adjusted position by spring-pressed detents 95 mounted in sockets 96 of the transmission housing 15. These detents are adapted to register with and extend into depressions 97 formed in the lower surfaces of the shifter rails, as illustrated in Figs. 11 and 13.

During operation of the selector lever 51, it is thus movable in two transversely connected paths about the longitudinal axis of the steering column. This lever may be moved from one of these paths to another about an axis extending transversely of the longitudinal axis of the steering column. Oscillatory movement of the lever about the longitudinal axis of the steering column effects operation of a selected gear ratio establishing element which is selected for operation by tilting of the lever about an axis extending transversely to the length of the steering column.

It will be noted that the lever 51 will normally rest in the lower of the two paths indicated by the dotted lines in Fig. 2 because of the influence of the spring 79 (Fig. 5) which constantly urges plate 82 and shaft 65 axially upwardly of the steering column. This is true regardless of the position of the shift collar 46 because the Bowden cable 89 is not connected thereto.

In describing the operation of the device, let it be assumed that the motor vehicle is at rest with the motor running and the gear shifter lever 51 in the neutral position as shown in Fig. 2. In starting the vehicle, the operator depresses the clutch pedal in the usual manner and grasps the knob 54 of the lever 51 and rocks the lever about the fulcrum 56 longitudinally upwardly of the steering column. This action forces shaft 65 and plate 82 downwardly, thereby forcing plunger 78 downwardly. This downward movement of plunger 78 is transmitted to the plunger 88 by means of the cable 81 and collar 46 (Figs. 9 and 10) is moved longitudinally along the shaft 42 against the pressure of spring 51'. Lever 51 is then pulled backwardly toward the driver which action rotates shaft 65 and plate 82 clockwise of the steering column, thereby moving arm 43 forwardly of the transmission through the intermediary of the link 90. Movement of the arm 43 forwardly rotates shaft 42 and the collar 46 which is splined to the shaft 42 in a clockwise direction, thereby shifting rail 35 with which collar 46 is now operatively connected by means of the part 50 thereby meshing the gear 21 with the gear 29 to establish low speed drive through the transmission. Engagement of the clutch will now cause the vehicle to be driven in low gear. The knob 54 is now in first speed position as indicated diagrammatically in Fig. 2 and release of this knob by the driver will allow it and the lever 51 to move longitudinally downwardly of the steering column to the high speed position as shown in Fig. 2, the plunger 88 being withdrawn from contact with the part 89 of the collar 46 by the spring 79 which reacts through the plunger 78 against the plate 82 thereby moving shaft 65 upwardly of the steering column.

It will thus be seen that the shift from low or first speed to second or intermediate speed may be made by a straight forward movement of the lever 51. As soon as the knob 54 has moved from the high speed position as shown in Fig. 2 to neutral position, gear 21 will have been moved out of meshing engagement with gear 29 and shifter rail 35 will be in neutral position. Collar 46 will then be released from contact with rail 35 and will return to the position shown in Fig. 9 under the influence of the spring 51'. Movement of the lever 51 forwardly into second speed position will rock the shaft 42 in a counterclockwise direction and mesh clutch teeth 27' with clutch teeth 27 to establish second or intermediate speed drive through the transmission. It will be understood that this shifting movement may be accomplished very quickly and positively because of the fact that the lever 51 is moved forwardly away from the driver only without the necessity of "feeling" through the cross-over which connects the two paths of movement of the lever 51 as is usual in conventional shifting mechanism. The smoothness and rapidity of the shifting movement from first to second speed is facilitated by my novel arrangement of parts. Because of the fact that the plunger 88 and cable 81, plate 82 and shaft 65 are returned to the position shown in Figs. 2, 5 and 9 immediately after the transmission has been shifted into low speed, the spring 51' is required to move the collar 46 only during the shift from first to second speed. Because spring 51' is relieved of the frictional load of the plungers 78 and 88 and the shaft 65 by the action of the spring 79, a very rapid and desirable "snap over" action of the collar 46 results.

The shift from second speed to high speed driving of the transmission is accomplished by moving the lever 51 backwardly into the high speed position shown in Fig. 2. This results in a clockwise movement of the shaft 42 which meshes the clutch teeth 26' with clutch teeth 26.

Figs. 14 to 16 inclusive show a slightly modified form of my invention which differs from that previously described in that a spring 104 is provided in place of the spring 79. Spring 104 surrounds shaft 65 and bears at its lower end against the backing member 65' which is fixed to the outer steering column tube 63. The upper end of the spring bears against the hub 69 and moves with the shaft 65. It will thus be seen that spring 104 tends to maintain the shaft 65 at the extremity of its upward movement longitudinally of the steering column, thereby maintaining the lever 51 in a lower path of movement as indicated in Fig. 2.

The plunger 78' which replaces plunger 78 is positively connected to the plate 82 by the reduced extension 100 which extends through a slot 101 which is provided in the plate 82 in Fig. 16. The plunger 78' is loosely secured to the plate 82 by means of the nut 102, slot 101 accommodating rotative movement of the plate with respect to plunger 78'.

The operation of the modification just described is exactly the same as that previously described for the form of the invention shown in Figs. 1 to 12 inclusive. Lever 51 will normally be maintained in the path indicated in Fig. 2 and must be lifted upwardly against the pressure of spring 104 to effect reverse or first speed drive through the transmission. As soon as reverse or first speed drive setting of the transmission has been effected, release of lever 51 will allow the spring 104 to move said lever to second or high position indicated in Fig. 2 as the case may be. Plungers 78' and 88 will be returned along with shaft 65 and plate 82 because of the connection 100—102 between plungers 78' and plate 82.

Both forms of the invention permit the very desirable "snap-over" action of the collar 46 which allows the shift from first to second speed to be accomplished rapidly and smoothly by straight forward movement of the shift lever. By eliminating the necessity for the vehicle driver to have to feel his way through the central bar of the H-shape path which connects the arcuate paths of movement of the shift lever, the shifting of the gears in the transmission is greatly simplified and the possibility of danger to the transmission by accidental shifting into reverse after the car has started moving forwardly is virtually eliminated.

Although but two of the many possible embodiments of my invention have been described, it is not desired to limit the invention except as defined in the claims appended hereto.

I claim:

1. In a power transmission, a plurality of speed ratio controlling devices operable to effect selective drive through the transmission, a driver operated selector element adapted for shifting movements in transversely connected paths of corresponding directions to a plurality of stations of transmission control for effecting operation of said speed ratio controlling devices, means for mounting said selector element for swinging movement about a common axis along said paths of corresponding directions, said mounting means including a fulcrum support accommodating rocking movement of an end portion of said selector element in the general direction of said axis, means operating in response to shift of said selector element for effecting operation of said speed ratio controlling devices and means for yieldably maintaining said selector element in one of said paths regardless of the position of said speed ratio controlling devices.

2. In a motor vehicle having a variable speed power transmission provided with a plurality of speed ratio controlling devices operable to effect selective drives through the transmission, a driver operated selector element adapted for to-and-fro shifting movements in a pair of parallel paths, movement in one of said paths effecting either low speed or reverse setting of said ratio controlling devices, movement in the other of said paths effecting either second speed or high speed setting of said ratio controlling devices and means for yieldably maintaining said selector element in the latter of said paths regardless of the setting of said ratio controlling devices.

3. Gear shifting apparatus for a motor vehicle provided with a steering column and a power transmission comprising, a shift lever, means for mounting said lever on said column for oscillation about the longitudinal axis thereof in a plurality of parallel paths, means connecting said lever and said power transmission and so constructed and arranged that said lever may be oscillated in one of said paths to effect a low or reverse setting of said transmission and in another of said paths to effect an intermediate or direct drive setting of said transmission and means associated with said connecting means for yieldably maintaining said lever in one of said paths regardless of the setting of said transmission.

4. Gear shifting apparatus for a motor vehicle provided with a steering column and a power transmission comprising, a shift lever, means for mounting said lever on said column for oscillation about the longitudinal axis thereof in a plurality of parallel paths and for rocking movement about an axis extending transversely to said longitudinal axis, a shaft operatively associated with said column and connected with said lever and so arranged that oscillation of said lever about the longitudinal axis of said column will rotate said shaft and rocking movement about said transverse axis will shift said shaft longitudinally, means connecting said shaft with said power transmission for transmitting rotative movements of said shaft, separate means connecting said shaft with said power transmission for transmitting longitudinal movements of said shaft and means associated with the last named means for constantly urging said shaft to the extremity of its movement in one direction.

5. In a motor vehicle having a power transmission and a steering column, apparatus for shifting gears in said transmission comprising a lever rockably mounted on said column, a shaft disposed longitudinally of said column and connected to said lever, a plate fixed to the lower end of said shaft, a shifter element in said transmission, a Bowden cable assembly including a plunger at one end bearing against said plate and a plunger at the opposite end bearing against said shifter element, means for yieldably urging said shifter element into contact with said last named plunger and means associated with said first named plunger for yieldably urging said plunger and plate upwardly of said column.

6. In a motor vehicle having a power transmission and a steering column, apparatus for shifting gears in said transmission comprising a lever rockably mounted on said column, a shaft disposed longitudinally of said column and connected to said lever, a plate fixed to the lower end of said shaft, a shifter element in said transmission, a Bowden cable assembly including a plunger connected to said plate and a plunger at the opposite end bearing against said shifter element, means associated with said shifter element for yieldably urging said shifter element into contact with said last named plunger and means associated with said shaft and said column for yieldably urging said shaft upwardly of said column.

7. In a vehicle having a tubular steering column; power transmission mechanism comprising a plurality of speed ratio controlling devices, a housing carried by said column at the upper end thereof, a control shift lever having an end portion extending into said housing, means for mounting said lever on said housing for oscillation about the longitudinal axis of said steering column and rocking movement about an axis extending transversely of said longitudinal axis, a member extending longitudinally within said steering column shiftable axially thereof in response to movement of said lever about said transverse axis and rotatable relative to said steering column in response to movement of said lever about said longitudinal axis, an element for operating upon said speed ratio control devices to effect operation of a selected one thereof, a spring yieldably holding said element in position to operate upon at least a selected one of said speed ratio controlling devices, mechanism including a flexible cable responsive to one of said movements of said member moving said element against the action of said spring into operative relationship with respect to another of said speed ratio controlling devices, and mechanism responsive to the other movement of said member for actuating said element to effect operation of said last mentioned speed ratio controlling device.

8. In a variable speed ratio power transmission comprising a plurality of members for establishing a plurality of different directions and speed ratio drives, a common movable shift member for selectively operably engaging said plurality of members, yieldable means for yieldably pushing said shift member into operative engagement with one of said plurality of members, control mechanism for controlling the operation of said transmission comprising a plunger operably associated with said shift member, means for actuating said plunger from a neutral position to move said shift member into operative engagement with another of said plurality of members including a rockable lever, and means for restoring said plunger and lever to said neutral position after actuation thereof.

9. In a variable speed ratio power transmission comprising a plurality of members each of which is adapted to be reciprocated to establish a plurality of different speed ratio drives, a common movable shift member for selectively operably engaging said plurality of members, yieldable means for urging said shift member into operative engagement with one of said plurality of members, rocking means for rocking said shift member to reciprocate said members, a lever for controlling said shift member, means operatively associated with said shift member and said lever whereby oscillation of said lever will actuate said rocking means and rocking of said lever will move said shift member against said yieldable urging means, said operatively associated means including means yieldably opposing rocking of said lever.

10. In a variable speed ratio power transmission comprising a plurality of members each of which is adapted to be reciprocated to establish a plurality of different speed ratio drives, a common movable shift member for selectively operably engaging said plurality of members, yieldable means for urging said shift member into operative engagement with one of said plurality of members, rocking means for rocking said shift member to reciprocate said members, a plate for controlling said shift member, a flexible cable having a plunger at each end thereof bearing against said shift member and said plate respectively whereby bodily movement of said plate will move said shift member against said yieldable urging means into engagement with another of said plurality of members, a link operatively connecting said plate and said rocking means, and yieldable means operatively associated with one of said plungers for resisting bodily movement of said plate.

11. In a variable speed ratio power transmission comprising a plurality of members each of which is adapted to be reciprocated to establish a plurality of different speed ratio drives, a common movable shift member for selectively operably engaging said plurality of members, yieldable means for urging said shift member into operative engagement with one of said plurality of members, rocking means for rocking said shift member to reciprocate said members, a plate for controlling said shift member, a flexible cable having a plunger at one end bearing against said shift member and a plunger at the other end connected to said plate by means of a pin and slot connection whereby bodily movement of said plate will move said shift member against said yieldable urging means into engagement with another of said plurality of members, a link operatively connecting said plate and said rocking means, a manually operable lever for bodily moving and for oscillating said plate, a shaft connecting said lever and said plate, and yieldable means operatively associated with said shaft for resisting said bodily movement.

JAMES R. McCORDIC.